US010510081B2

(12) United States Patent
Nair et al.

(10) Patent No.: US 10,510,081 B2
(45) Date of Patent: Dec. 17, 2019

(54) CARGO AIR WAYBILL AUDIT (71) Applicant: Unisys Corporation, Blue Bell, PA (US)

(72) Inventors: Manu Kamalappan Nair, Bangalore Karnataka (IN); Abhijith Sreenivasan, Bangalore Karnataka (IN)

(73) Assignee: Unisys Corporation, Blue Bell, PA (US)

( * ) Notice: Subject to any disclaimer, the term of this patent is extended or adjusted under 35 U.S.C. 154(b) by 792 days.

(21) Appl. No.: 14/924,836

(22) Filed: Oct. 28, 2015

(65) Prior Publication Data
US 2016/0125372 A1 May 5, 2016

(51) Int. Cl.
*G06Q 40/00* (2012.01)
*G06Q 20/40* (2012.01)
*G06Q 30/04* (2012.01)

(52) U.S. Cl.
CPC ........... *G06Q 20/405* (2013.01); *G06Q 30/04* (2013.01)

(58) Field of Classification Search
CPC ....... G06G 40/00; G06G 20/405; G06G 30/04
USPC ......................................................... 705/40
See application file for complete search history.

(56) References Cited

U.S. PATENT DOCUMENTS

| 2005/0240524 | A1* | 10/2005 | Van De Van | G06Q 20/102 705/40 |
| 2014/0089031 | A1* | 3/2014 | Bell | G06Q 10/06313 705/7.23 |
| 2015/0180894 | A1* | 6/2015 | Sadovsky | G06F 3/0481 726/22 |
| 2015/0324715 | A1* | 11/2015 | Nelson | G06Q 10/0838 705/7.28 |
| 2015/0324741 | A1* | 11/2015 | Parry | G06Q 10/0833 705/333 |

OTHER PUBLICATIONS

Management Dynamics Releases Air Rate Manager Solution, Business Wire Jul. 31, 2008: NA.*
Unisys Launches Next-Generation Cargo Revenue Accounting Solution, PR Newswire Apr. 29, 2014: NA.*

* cited by examiner

*Primary Examiner* — Lalita M Hamilton (57) ABSTRACT

The present invention provides apparatuses and methods for analyzing patterns and generating rules related to actions taken in auditing cargo air waybills. Various embodiments of the invention may receive one or more user actions applied to an air waybill and analyze the user's actions to determine if a pattern of behavior is consistent in the user's actions. When one or more patterns are determined, one or more rules may be generated based on the patterns and the actions. If a generated rule is approved by a user, the generated rule may be applied to any future air waybill sent to an accounting system for auditing. The integration of pattern analysis and rule generation may ease some or all of the burden of manually auditing thousands of air waybills daily and reduce the temporal costs of internal audit staff and the financial costs of employing an outside company to audit cargo air waybills.

17 Claims, 10 Drawing Sheets

|  | 376 | AwB No. 777 50897066 | |
|---|---|---|---|
| Chargeable Weight(kg) | | 70% of WC | Variance% OC with 70% of WC |
| | Rate | Amount | |
| Other Charge(OC) - XX | 67.5 | 25380 | |
| Weight Charge(WC) | 90 | 33840 | 23688 |
| User Corrected OC | 63 | 23688 | 0 |
| Difference% in OC Rate | 3.4482759 | | 3.448275862 |

CARGO AIR WAYBILL AUDIT

FIELD OF THE DISCLOSURE

The instant disclosure relates to system management. More specifically, this disclosure relates to automation of auditing air waybills in an accounting system.

BACKGROUND

Air waybills are essential to any process related to the shipment of goods anywhere in the world. They may serve as a receipt of goods by an airline and may represent a contract between a shipper of goods and the airline responsible for transporting the goods to the desired location. Air waybills may include terms and conditions of carriage such as the air carrier's limits of liability, a description of goods, and applicable charges. Several companies, such as United Parcel Service (UPS) and Fedex, use air waybills in their air cargo transport operations to support millions of shipments to global destinations daily.

Each air waybills may contain a collection of fields that need to be filled out by a user, such as the name of the shipper, the name of the air carrier, the cost of the shipment, and the expected date of receipt of goods. Because air waybills are essential documents that contain several important pieces of information, auditing becomes a critical step that accounting systems have to implement into their process to verify the accuracy of the information entered into the air waybill and make necessary changes as required. In addition to verifying information on an air waybill, auditing is also desired to modify air waybills based on certain rules imposed on an air waybill by a particular entity, such as an airline cargo shipment company. For example, if a company wants to enforce a special charge on a cargo shipment based on the weight of the cargo itself including the palettes that support the cargo, but the air waybill only lists the weight of the cargo itself, after the total cargo weight is measured, a user is tasked with manually auditing the air waybill to accurately reflect the correct special charge allowing the shipment company to prevent losses in revenue.

Manually auditing air waybills is usually a cumbersome task that requires a user to accurately and alertly track every air waybill before the air waybill is ready to be invoiced. Moreover, different users typically have different approaches for auditing air waybills, so multiple parties are involved to check the accuracy and quality of a users' work product on the air waybill. With the amount of air waybills that are generated daily, a user may easily be overworked, and an overworked user is bound to make mistakes in processing the air waybill, Some airline cargo shipment companies have to resorted to outsourcing auditing to third party companies for processing, but this action results in increased costs to the airline company, increased delays in finding discrepancies in the air waybill and claiming necessary refunds, and increased disputes with agents at third party companies over mistakes made in the air waybill processing and recuperation of lost funds. Therefore, a method and system for integrating a level of automation to the auditing of air waybills may be beneficial to airline cargo shipment companies by allowing the number of users involved in the process to be significantly reduced.

SUMMARY

Embodiments of the invention described below may allow airline cargo shipment companies to decrease costs by processing the air waybills internally instead of utilizing third party companies. When an air waybill is submitted for manual audit, actions taken by the auditor on the air waybill may be maintained in a database. Based on a collection of actions, patterns may be analyzed to obtain similarities in the actions taken on the air waybills. Rules may be generated by the system that are associated with these patterns. If a particular rule is accepted by a user, the rule may be stored in a database and invoked on future air waybills that contain patterns of similar actions taken on an air waybill. Manual auditing may still be necessary to further provide action samples for developing different patterns for air waybills, but the physical burden of manually auditing air waybills by performing the same repetitive actions on future air waybills may be significantly reduced with the integration of these pattern-defined rules. Furthermore, a decrease in the time spent processing air waybills may lead to an increased production in several areas of accounting systems including the processing of air waybills.

According to one embodiment, a method may include receiving at least one audit transaction of a plurality of audit transactions associated with a plurality of air waybills; determining a pattern related to the at least one audit transaction and a plurality of previously stored audit transactions associated with the plurality of air waybills; and generating a rule associated with the pattern related to the at least one audit transaction and the plurality of previously stored audit transactions. When the generated rule is approved by a user, the method may further include storing the rule associated with the pattern in a database.

According to another embodiment, an apparatus may include a processor and a memory coupled to the processor. The processor may be configured to perform the steps of receiving at least one audit transaction of a plurality of audit transactions associated with a plurality of air waybills; determining a pattern related to the at least one audit transaction and a plurality of previously stored audit transactions associated with the plurality of air waybills; and generating a rule associated with the pattern related to the at least one audit transaction and the plurality of previously stored audit transactions. When the generated rule is approved by a user, the processor may be further configured to perform the step of storing the rule associated with the pattern in a database.

According to a further embodiment, a computer program product may include a non-transitory computer readable medium containing instructions which, when executed by a processor of a computing system, cause the processor to receive at least one audit transaction of a plurality of audit transactions associated with a plurality of air waybills; determine a pattern related to the at least one audit transaction and a plurality of previously stored audit transactions associated with the plurality of air waybills; and generate a rule associated with the pattern related to the at least one audit transaction and the plurality of previously stored audit transactions. When the generated rule is approved by a user, a non-transitory computer readable medium of the computer program product may further include instructions which, when executed by the processor of the computing system, cause the processor to store the rule associated with the pattern in a database.

The foregoing has outlined rather broadly the features and technical advantages of the present invention in order that the detailed description of the invention that follows may be better understood. It is first noted here that the terms "transaction" and "action" may be synonymous throughout this disclosure. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention, it should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a limitation of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
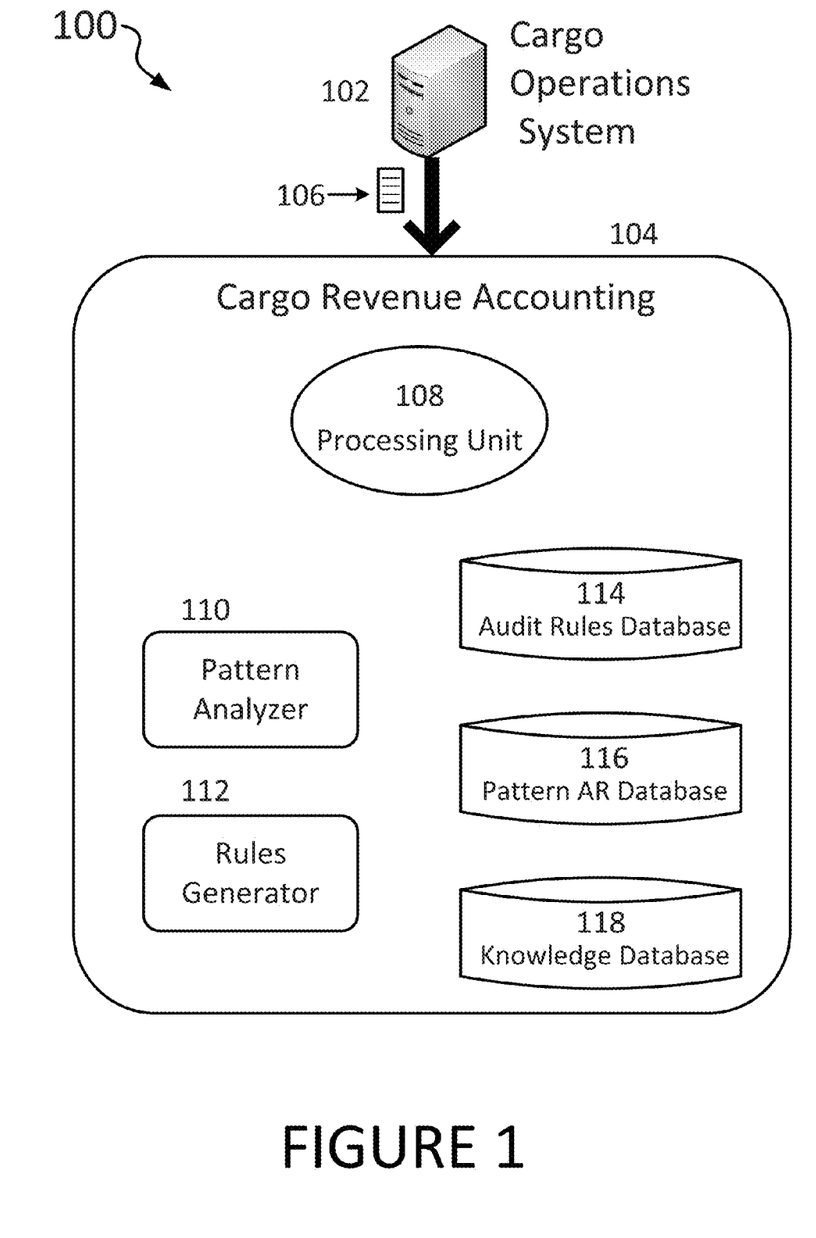
FIG. 1 is an illustration of an auditing system that may be invoked to audit an air waybill according to one embodiment.

FIG. 1 is an illustration of an auditing system that may be invoked to audit an air waybill according to one embodiment. System 100 may include a cargo operations system 102 and a cargo revenue accounting system 104. Both the cargo operations system 102 and the cargo revenue accounting system 104 may contain a computing system that includes processing units, databases, user interfaces, random access memory (RAM), a read only memory (ROM), one or more system buses, a keyboard, a pointing device, a touch screen, an input/output (I/O) adapter, a communications adapter, a user interface adapter, a display adapter, and other computing components. When an air waybill is generated for a shipment, the cargo operations system 102 may perform a series of steps directed towards the an air waybill 106, such as weighing the cargo, entering product codes, and filling out any other information pertinent to the air waybill. Upon completion of these steps, the cargo operations system may transmit the air waybill 106 to the cargo revenue accounting system 104 for processing. Included in one or more steps that system 104 performs related to processing the air waybill 106 may be auditing the air waybill 106.

When the air waybill reaches the cargo revenue accounting system 104, processing unit 108 may be configured to invoke a collection of computing components, including a pattern analyzer 110, a rules generator 112, a user-defined audit rules database 114, a knowledge database 116, and a pattern audit rules (AR) database 118. The processing unit 108 may include a server, processor, microprocessor, graphics processing unit (GPU), a field programmable gate array (FPGA), and any other component configured to process data and computing instructions. The processing unit may be configured to operate or invoke each of the pattern analyzer 110, the rules generator 112, the user-defined audit rules database 114, the knowledge database 116, and the pattern AR database 118 to perform functions related to auditing air waybill 106.

The pattern analyzer 110 may invoke or contain one or more engines and/or algorithms configured to invoke one or more actions taken on air waybill 106. When multiple auditing actions are taken on air waybills, the actions may be analyzed to determine if a pattern exists in the course of actions taken on air waybills. For example, if an auditor of an air waybill applies a ten percent discount to the total charge for the last 100 air waybills that have a product code ending in INX, a pattern may be determined in the pattern analyzer 108 signaling that product codes ending in INX tend to have a ten percent discount applied to the total charge. Analyzing patterns may include one, some, or all of the features utilized in pattern recognition. Some of the algorithms invoked in the pattern analyzer 110 may include parametric classification algorithms, nonparametric classification algorithms, clustering algorithms, ensemble learning algorithms, general algorithms predicting arbitrarily-structured sets of labels, multilinear subspace learning algorithms, real-valued sequence labeling algorithms, regression algorithms, sequence labeling algorithms, and any other algorithm related statistical analysis, pattern analysis and pattern recognition. The pattern analyzer 110 may operate within the system 104 or outside the system 104. In one embodiment, pattern analyzer 110 may include its own processing unit that communicates with processing unit 108 of system 104 or any of the units 112, 114, 116, or 118.

The rules generator 112 may generate or contain one or more engines configured to generate one or more rules associated with the analyzed pattern. After a series of actions have been analyzed and a pattern has been determined, the rules generator 112 may create a rule that may be invoked on the air waybill 106. In the same example from above, in response to a pattern being determined in the pattern analyzer 108 signaling that product codes ending in INX tend to have a ten percent discount applied to the total charge, the following rule such as 'Apply 10% Discount to Product Codes Ending in INX,' may be generated in the rules generator 112 to present to the auditor. Rules generated in generator 112 may be coded in any format that may be used by the cargo operations system 102, the cargo revenue accounting system 104, or any other existing or future system associated with air waybills. The rules generator 112 may operate within the system 104 or outside the system 104. In one embodiment, the rules generator 112 may include its own processing unit that communicates with processing unit 108 of system 104 or any of the units 110, 114, 116, or 118.

The user-defined audit rules database 114 may include a collection of rules that are defined by an auditor or a user of the cargo revenue accounting system 104. If an auditor has prior knowledge about the types of modifications that he or she plans to make for auditing a series of air waybills, the auditor may create a user-defined rule to apply to an air waybill as desired. In one embodiment, these rules may be defined for a fixed amount of time or defined indefinitely. In another embodiment, the rules in the user-defined audit rules database 114 may be utilized in conjunction with the auditing actions invoked on air waybill 106 to determine a pattern of auditing actions and to generate rules based on the audit actions, patterns, and user-defined audit rules in database 114. Additionally, the rules in the user-defined audit rules database 114 may be invoked on air waybill 106 prior to, in between, or after the pattern analysis and rules generation based on the pattern. The user-defined audit rules database 114 may operate within the system 104 or outside the system 104 and may include its own processing unit that communicates with processing unit 108 of system 104 or any of the units 110, 112, 116, or 118 to select any or all of the rules to be invoked on air waybill 106.

The knowledge database 116 may include a collection of actions taken on previous air waybills by an auditor or a user of the cargo revenue accounting system 104. If an auditor makes a modification to an air waybill, such as changing the total charge of a shipment to reflect the ten percent discount, this action may be stored in the knowledge database 116. The pattern analyzer 110 may receive one or more actions taken by an auditor on air waybill 106 that are stored in knowledge database 116 to analyze a relevant pattern. In one embodiment, the knowledge database 116 may also include a filtering function that filters the actions based on an attribute of the action or the air waybill 106. The pattern analyzer 110 may receive actions filtered by a user-defined attribute to conduct a more targeted analysis based on desired attributes and bypass undesired attributes of an action. The knowledge database 116 may operate within the system 104 or outside the system 104 and may include its own processing unit that communicates with processing unit 108 of system 104 or any of the units 110, 112, 114, or 118 to select any or all of the actions of an air waybill 106 to be analyzed.

The pattern AR database 118 may include a collection of pattern-derived rules that may be invoked by an auditor or a user of the cargo revenue accounting system 104 to apply to an air waybill 106. After the pattern analyzer 110 has determined a pattern of a series of actions, a rules generator 112 has generated a rule, and the rule has been approved by the auditor, the pattern-derived audit rule and associated action may be stored in the pattern AR database 118. A pattern-derived audit rule may be a rule generated in a rules generator 112. In one embodiment, the pattern AR database 118 may contain pattern-derived audit rules based on an analyzed pattern as well as one or more user-defined audit rules invoked by the pattern analyzer 110 to determine the pattern. If more than one pattern-derived audit rule exists for a particular pattern, the pattern AR database 118 may be configured to select a rule for the auditor to invoke on an air waybill 106 based on any factor determined in system 104.

In another embodiment, the auditor may be provided a list of pattern-derived audit rules that apply to a particular pattern. In this case, the auditor may select one or more pattern-derived audit rules to invoke on the air waybill. The pattern AR database 118 may operate within the system 104 or outside the system 104 and may include its own processing unit that communicates with processing unit 108 of system 104 or any of the units 110, 112, 114, or 116 to store or invoke any or all of the pattern-derived audit rules to be invoked on air waybill 106.

Figure 2A:
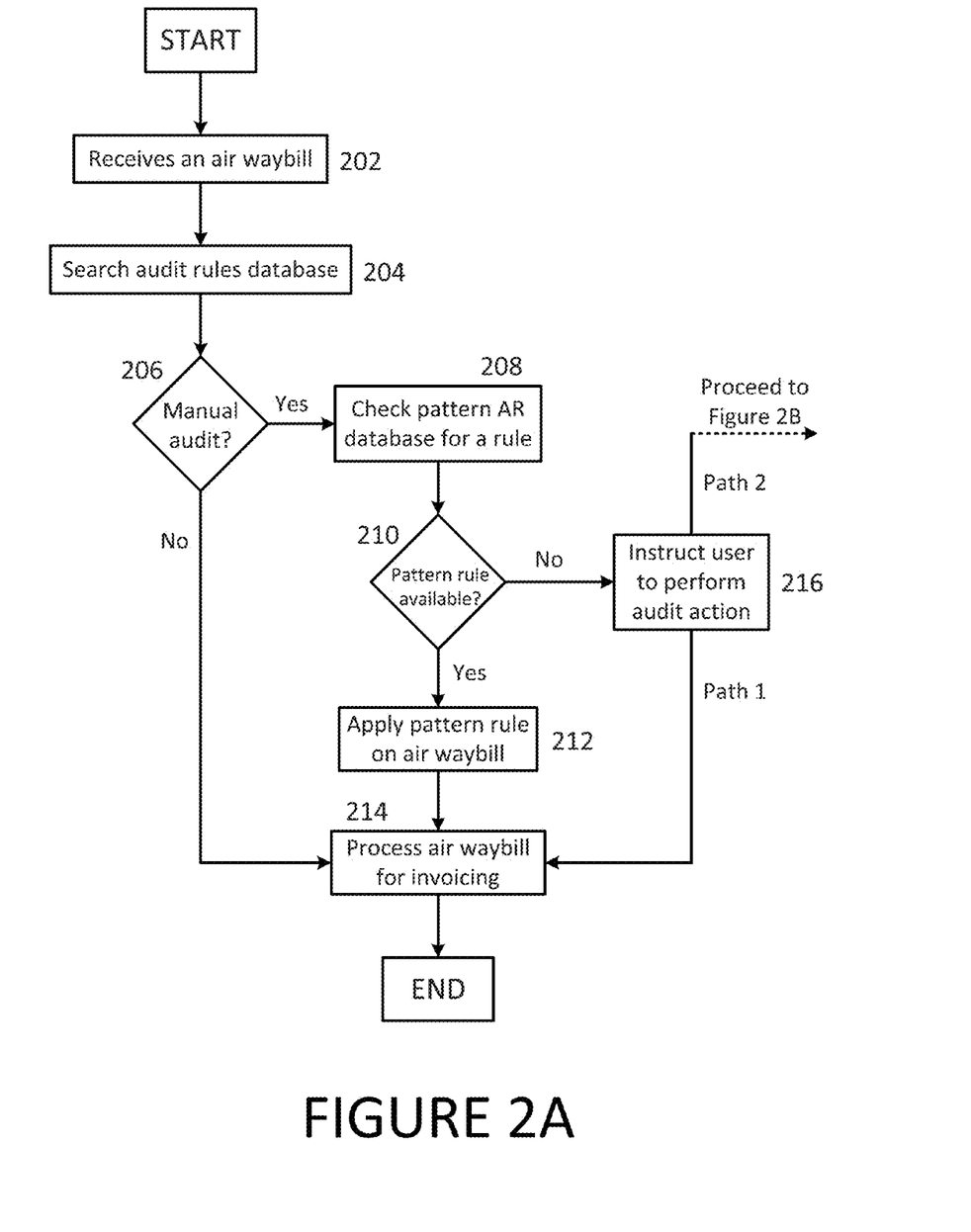
FIG. 2A is a flow chart of a method for auditing an air waybill according to one embodiment.

FIG. 2A is a flow chart of a method for auditing an air waybill according to one embodiment. The method begins at step 202 where a processing unit 108 of the cargo revenue accounting system 104 receives an air waybill 106 that is ready for auditing from the cargo operations system 102. After receiving the air waybill 106, the processing unit 108 may search or may be configured to invoke an auditor to search for a user-defined rule in the user-defined audit rules database 114 at step 204. In one embodiment, the rules in database 114 may be filtered by any attribute desired by the auditor or user of system 104. In another embodiment, the rules in database 114 may be filtered by user. For example, Auditor #1 may search rules stored previously by Auditor #1, but if Auditor #2 is performing an audit for Auditor #3, Auditor #2 may search and access rules stored previously by Auditor #3. At step 206, a decision diamond may be encountered in which the processing unit 108 may decide or be configured to invoke an auditor to decide if a manual audit is required for the air waybill 106. If a manual audit is not required (a 'No' response of decision diamond 206), the air waybill may be processed to be invoiced by the processing unit 108 at step 214 and the method may terminate until another air waybill is received by the processing unit.

On the other hand, if a manual audit is required (a 'Yes' response of decision diamond 206), The process may continue to step 208 where the processing unit 108 may search the pattern AR database 116 to determine if a pattern-derived audit rule generated from previous actions taken on air waybills has been stored in database 116 to be applied to the current air waybill 106. At step 210, a second decision diamond may be encountered in which processing unit 108 may decide that a pattern-derived audit rule is available. If a pattern-derived audit rule is available in database 116 (a 'Yes' response of decision diamond 210), the processing unit 108 may apply the rule on the air waybill 106 at step 212. Afterwards, the air waybill may be processed for invoicing by the (processing unit 108 at step 214, and the method may terminate until another air waybill is received by the processing unit.

Figure 2B:
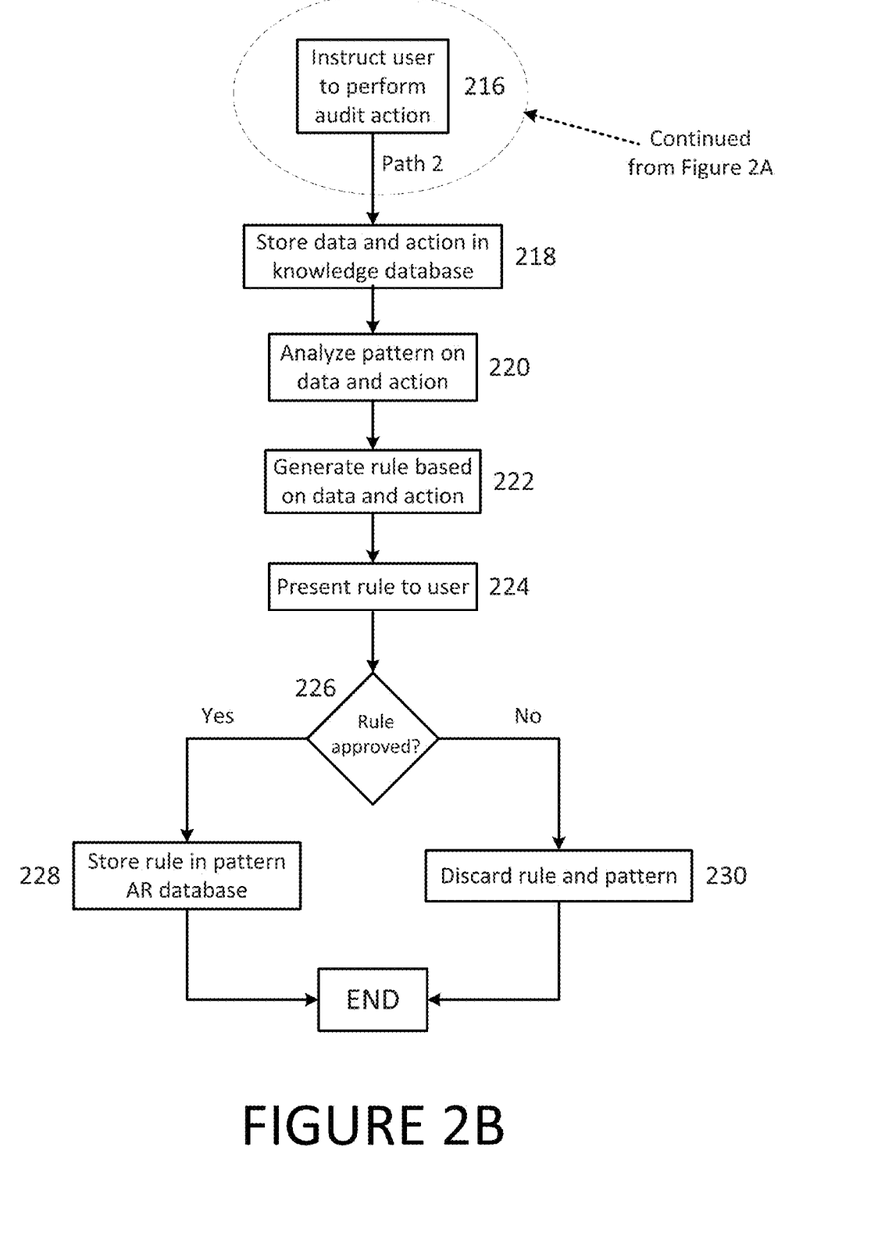
FIG. 2B is a flow chart of a method for analyzing patterns and generating rules related to auditing an air waybill according to one embodiment.

If a pattern-derived audit rule is not available in database 116 (a 'No' response of decision diamond step 210), the processing unit 108 may be configured to instruct the auditor to perform an auditing action on the air waybill 106 at step 216. An auditing action on an air waybill 106 may include modifying any attribute or field of the air waybill, such as the name of the shipper, the name of the air carrier, the cost of the shipment, other applicable fees, a queue number indicating when the booking will be worked on, a reason why the booking is queued, a customer segmentation, a date of shipment, and expected date of receipt of goods, an aircraft equipment type and version, the contents of the shipment, an International Air Transport Association (IATA) region, a place of shipment, special handling instructions, an agent's commission, any charges and discounts applied to an air waybill, any rates associated with an air waybill, and other attributes not included in this list. An auditing action on an air waybill 106 may also include verification of the information on the air waybill and general quality checking. After the auditor performs any and all actions taken on the air waybill 106 (step 216), two paths may be performed. In path 1, the air waybill 106 may be processed for invoicing by the processing unit 108 at step 214, and the method may terminate until another air waybill is received by the processing unit. Path 2 continues to the flow chart of FIG. 21B.

FIG. 2B is a flow chart of a method for analyzing patterns and generating rules related to auditing an air waybill according to one embodiment. This method continues from step 216 where the processing unit 108 may be configured to instruct the auditor to perform an auditing action on the air waybill 106. Following path 2, after the auditor performs actions on the air waybill 106, the auditing action, as well as information related to the air waybill 106, may be stored by the processing unit 108 in the knowledge database 118 at step 218. The knowledge database 118 may contain a collection of information and previous actions taken on previous air waybills as well as the action taken on the current air waybill 106.

At step 220, the processing unit 108 may analyze or invoke a pattern analyzer 110 to analyze all or a portion of data and actions in database 118 to determine if a pattern can be recognized based on the auditor's current and previous actions. The pattern analyzer 110 may include various algorithms and analytical tools for conducting the analysis. In one embodiment, the pattern analyzer may analyze an auditor's current and previous actions as well as common actions that are performed in other auditing systems. In another embodiment, the pattern analyzer 110 may invoke an anomaly detection scheme to filter out anomalies for simplifying the pattern analysis.

Based on the determination of a pattern, the processing unit 108 may generate or invoke a rules generator 112 to generate a rule based on the information and action associated with the analyzed pattern at step 222. In one embodiment, the rules generator 112 may generate multiple rules for a single pattern. A rule may also be active for a fixed amount of time or indefinitely active. At step 224, the generated rule may be presented to the auditor by the processing unit 108. The generated rule may be presented in a standard text format or in a coded format using a private key-public key cryptographic system. In this instance, a user may receive a public key from the system 104 to access the generated rule. Upon presenting the rule to the auditor, a decision diamond may be encountered at step 226 in which an auditor may be invoked by the processing unit 108 to approve the generated rule. If the auditor approves the generated rule (a 'Yes' response of decision diamond 226), the processing unit 108 may store the generated rule in the pattern AR database 116 at step 228, and the method terminates. The generated rule may become a pattern-derived audit rule and sit in the database along with the collection of other pattern-derived audit rules. However, if the auditor does not approve the generated rule (a 'No' response of decision diamond 226), the processing unit 108 may discard the rule and pattern at step 230, and the method terminates.

Figure 3:
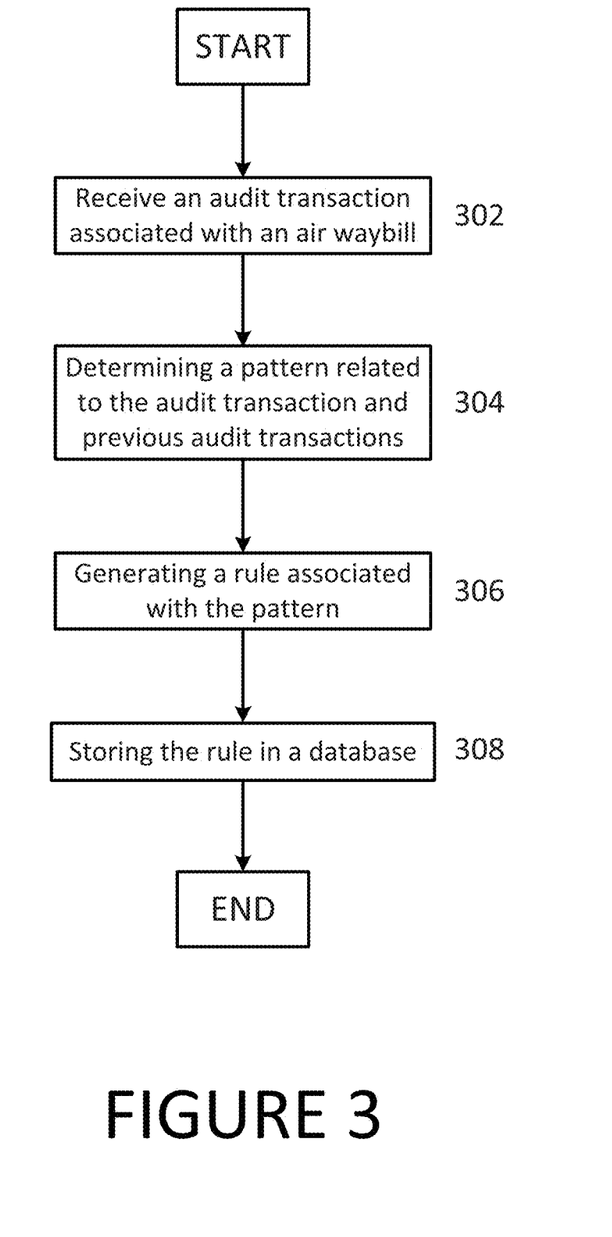
FIG. 3 is a flow chart of a generic method for auditing an air waybill based on patterns and rules according to one embodiment.

FIG. 3 is a flow chart of a generic method for auditing an air waybill based on patterns and rules according to one embodiment. The method starts at step 302 where a processing unit 108, a part of a computing system including a cargo revenue accounting system 104, receives an audit action associated with an air waybill 106. After the air waybill 106 is manually audited, a pattern may be determined by the processing unit 108 related to the audit action as well as previous audit actions taken on previous air waybills at step 304. Once a pattern is analyzed and determined by the processing unit 108, a rule may be generated by unit 108 that is associated with the determined pattern at step 306. Finally, if the generated rule is approved by an auditor or user of the computing system, at step 308, the generated rule may be stored in a database and applied to future air waybills that exhibit similar actions, patterns, or attributes.

Figure 4:
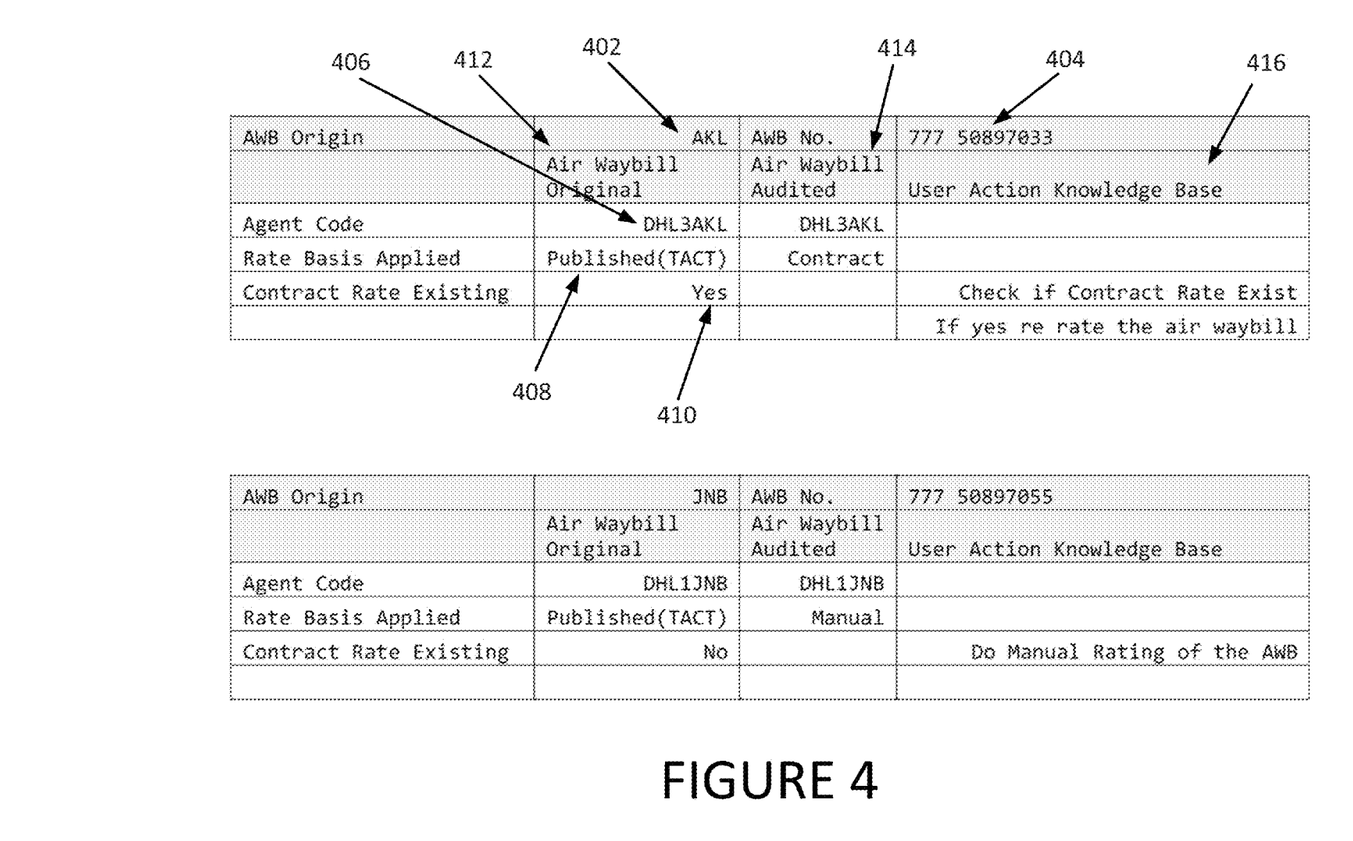
FIG. 4 is an illustration of user correction actions that may be applied to an air waybill based on a contract rate according to one embodiment.
Figure 5:
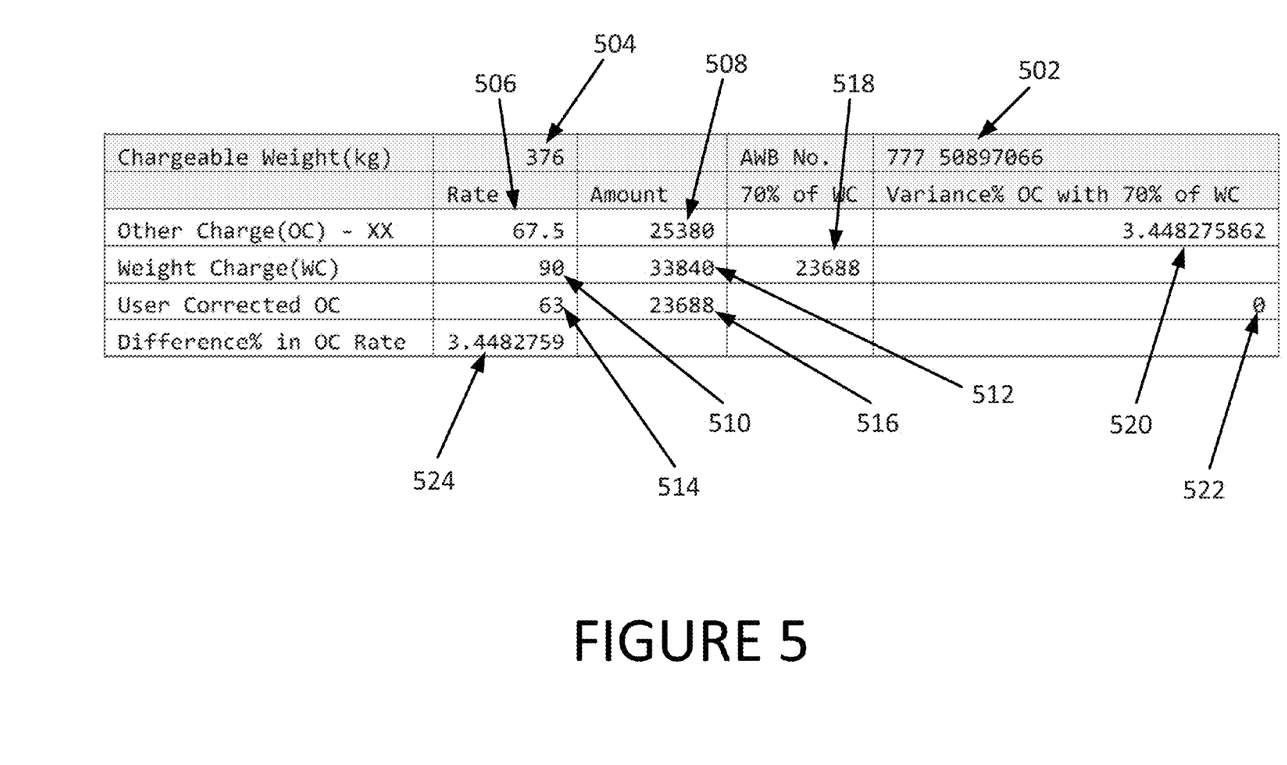
FIG. 5 is an illustration of user correction actions that may be applied to an air waybill based on a weight charge according to one embodiment.
Figure 6:
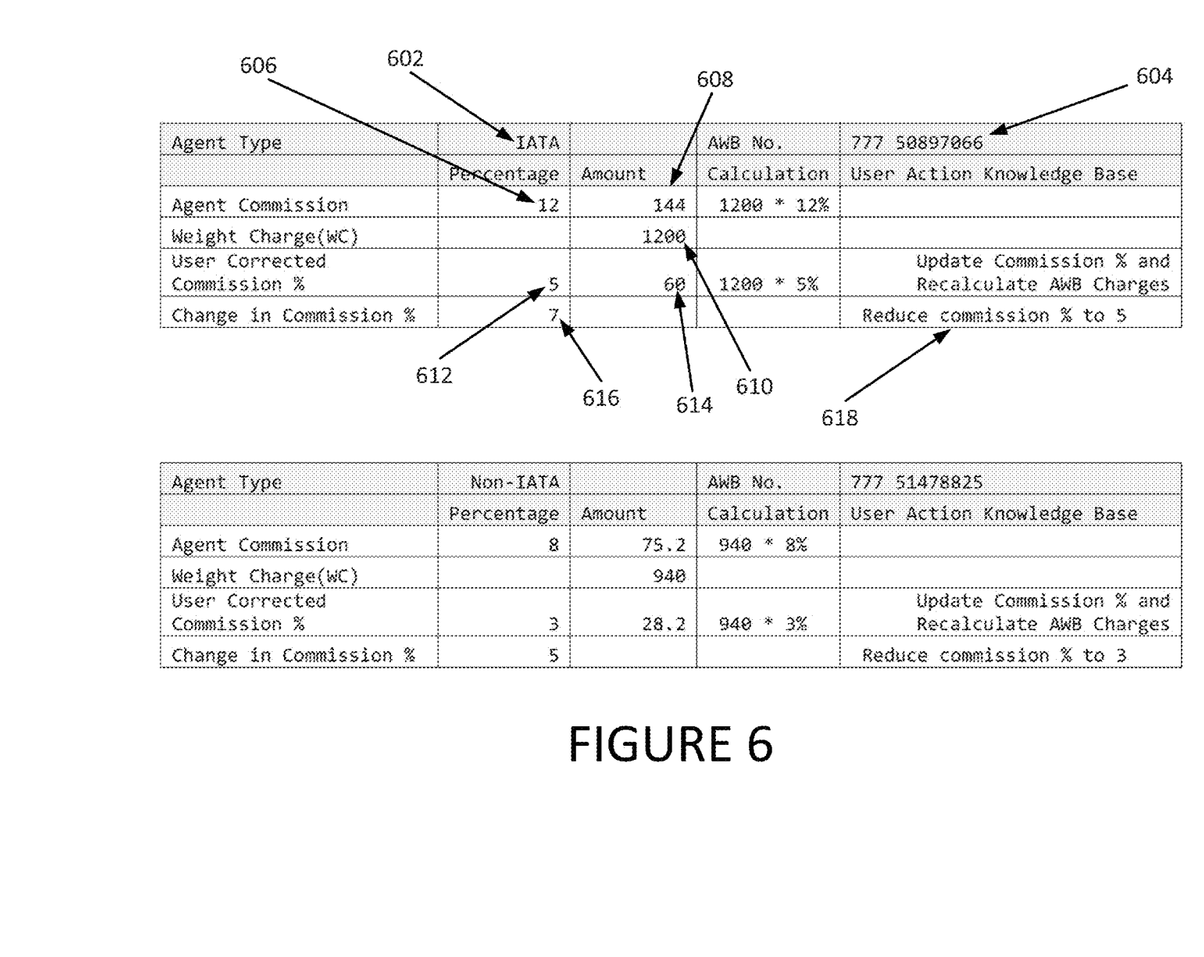
FIG. 6 is an illustration of user correction actions that may be applied to an air waybill based on an agent's commission according to one embodiment.

The following figures, FIGS. 4-6, illustrate how rules may be generated and applied for air waybills based on a collection of previously manually audited air waybills. It should be appreciated by those skilled in the art that the specific embodiments disclosed may be readily utilized as a basis for generating and applying rules to air waybills in addition to modifying or designing other means for carrying out methods, such as those disclosed in FIGS. 2-3. The process of analyzing patterns and generating rules may be automatically performed in system 104, thus lessening the burden of manually auditing air waybills.

FIG. 4 is an illustration of user correction actions that may be applied to an air waybill based on a contract rate according to one embodiment. The contents of this figure may include a portion of an air waybill or the complete air waybill. These user corrected actions of an air waybill may contain several attributes including an air waybill origin 402, an air waybill number 404, an agent code 406, an applied basis rate 408, an existing contract rate field 410, and other attributes. In addition, the air waybill may contain columns for entering information, such as an original air waybill column 412, an audited air waybill column 414, a user action knowledge base column 416, and other columns. The details of an air waybill may be manually audited, and the audited actions may be transmitted to the knowledge database 118. A manual audit for this an waybill may include an auditor performing the following actions: (1) checking if the contract rate is available for an agent, (2) modifying the air waybill to reflect the agent's contract rate, and (3) updating the air waybill with the recalculated total charge.

After a series of audit actions have taken place, a pattern analyzer 110 may determine some patterns related to the user's audit actions. These patterns may include:

(A) if the air waybill agent is DHL3AKL, the user checks if a valid contract is available. If it is available, modify the air waybill with the correct rate and recalculate the air waybill charges, (B) if the air waybill agent is DHL5JNB, the user checks if a valid contract is available. If it is available, modify the air waybill with the correct rate and recalculate the air waybill charges, and (C) if the air waybill agent is DHL1JNB, perform a manual rating and recalculate the air waybill charges.

Based on these patterns derived from the actions, rules may be generated for the air waybill and presented to the auditor for approval. These rules may include:

(I) Rule: Contract rate is applied for air waybills with agent DHL3AKL.
   Action: Check if a valid contract is available. If it is available, modify the air waybill with the correct rate and recalculate the air waybill charges.

(II) Rule: Contract rate is applied for air waybills with agent DHL5JNB.
   Action: Check if a valid contract is available. If it is available, modify the air waybill with the correct rate and recalculate the air waybill charges.

If approved, these pattern-derived audit rules may be stored in the pattern AR database 116 to be applied to future air waybills. For air waybill number 777 50897033, the agent code 406 may be DHL3AKL, and the existing contract rate field 410 in the original air waybill column 412 may contain the phrase 'Yes'. In the user knowledge base column 416, rule 1 regarding agent codes DHL3AKL, may be applied to air waybill number. For air waybill number 777 50897055, the agent code is DHL1JNB. Pattern-derived rules have only been generated and approved for rules associated with agent codes DHL3AKL, and DHL5JNB. Therefore, a rule may not exist for an air waybill with an agent code DHL1JNB, and the auditor may continue the action of performing a manual rating and recalculate the air waybill charges' previously taken on air waybills with this agent code. In this disclosure, it is possible that a rule may have been generated for air waybills with agent code DHL1JNB, but not approved by an auditor; hence, the pattern may have been discarded.

FIG. 5 is an illustration of user correction actions that may be applied to an air waybill based on a weight charge according to one embodiment. The contents of this figure may include a portion of an air waybill or the complete air waybill. These user corrected actions to an air waybill may contain several attributes including an air waybill number 502, a chargeable weight 504, an other charge (OC) rate 506, an OC amount 508, a weight charge rate 510, a weight charge amount 512, a user corrected OC rate 514, a user corrected OC amount 516, a 70% of the weight charge amount 518, an OC variance 520, an user corrected OC variance 522, a percent variance difference 524, and other attributes. The OC variance 520 may include the variance of the OC amount 508 and the 70% weight charge amount 518. Similarly, the user corrected OC variance 522 may include the variance of the user corrected OC amount 508 and the 70% weight charge amount 518. The percent variance difference 524 may be calculated as the user corrected OC variance 522 subtracted from the OC variance 520.

In one example, a cargo shipping company may only desire to charge a client an OC fee that is equal to 70% of the weight charge amount. After a series of audit actions have taken place, a pattern analyzer 110 may determine a pattern related to the user's audit actions. This pattern may include modifying the user corrected OC rate to provide a near-zero user corrected OC variance 522 for 70% of the weight charge amount 518. The 70% of the weight charge amount 518 may be calculated to be $23,688. After this pattern is analyzed and determined, a rule may be generated stating for example, 'Apply user corrected OC rate to be 70% of the weight charge divided by the chargeable rate.' If the pattern-derived rule is approved by the auditor, the rule may be stored in the pattern AR database 116 to be applied to future air waybills. An air waybill 777 50897066 may contain a chargeable weight 504 of 376 kilograms, an OC rate 506 of $67.50 per kilogram, and an OC amount 508 of $25,380. If this rule already existed in database 116 and was applied to this air waybill, the actual other charge rate applied to the air waybill 514 may equal $63 per kilogram as opposed to a standard OC rate 506 of $67.50 per kilogram and result in a user corrected OC amount 516 of $23,688, equal to that of the 70% of the weight charge amount 518. In addition, the user corrected OC variance 522 may equal zero.

FIG. 6 is an illustration of user correction actions that may be applied to an air waybill based on an agent's commission according to one embodiment. The contents of this figure may include a portion of an air waybill or the complete air waybill. These user corrected actions to an air waybill may contain several attributes including an agent type 602, an air waybill number 604, an agent commission percentage 606, an agent commission amount 608, a weight charge amount 610, a user corrected commission percentage 612, a user corrected commission amount 614, a change in commission 616, a user action knowledge base field 618, and other attributes. The details of an air waybill may be manually audited, and the audited actions may be transmitted to the knowledge database 118. A manual audit for this air waybill may include an auditor performing the following actions: (1) updating the air waybill and recalculating the air waybill charges and (2) changing the commission percentage for the agent.

After a series of audit actions have taken place, a pattern analyzer 110 may determine some patterns related to the user's audit actions. These patterns may include:

(A) if an agent's commission on an air waybill is more than 10% of the weight charge and the agent is a non-IATA agent, the user decreases the commission percentage to reduce the agent's commission to 10% of the weight charge and recalculate the air waybill charges, (B) if an agent's commission on an air waybill is between 5% and 10% of the weight charge and the agent is a non-IATA agent, the user decreases the commission percentage to reduce the agent's commission to 3% of the weight charge and recalculate the air waybill charges, and (C) if an agent's commission on an air waybill is more than 5% of the weight charge and the agent is an IATA agent, the user decreases the commission percentage to reduce the agent's commission to 5% of the weight charge and recalculate the air waybill charges.

Based on these patterns derived from the actions, rules may be generated for the air waybill and presented to the auditor for approval. These rules may include:

(I) Rule: Commission above 10% of weight charge and non-IATA agent.
   Action: Reduce agent commission to 10%.
(II) Rule: Commission between 5% and 10% of weight charge and non-IATA agent.
   Action: Reduce agent commission to 3%.
(III) Rule: Commission above 5% of weight charge and IATA agent.
   Action: Reduce agent commission to 5%.

If approved, these pattern-derived audit rules may be stored in the pattern AR database 116 to be applied to future air waybills. For air waybill number 777 50897066, the agent type 602 may read IATA, and the agent commission percentage 606 may be 12%. In the user knowledge base field 618, rule III regarding agent commissions above 5% for IATA agents may be applied to this air waybill. As a result, the user corrected commission percentage 612 may be entered as 5%, thus reducing the agent's commission percentage from 12% of the weight charge to 5%, a change in commission 616 of 7%. For air waybill number 777 51478825, the agent type 602 may read non-IATA, and the agent commission percentage 606 may be 8%. Rule II in the user knowledge base field 618 that pertains to agent commissions between 5% and 10% for non-IATA agents may be applied to this air waybill. As a result, the user corrected commission percentage 612 may be entered as 3%, thus reducing the agent's commission percentage from 8% of the weight charge to 3%, a change in commission 616 of 5%.

Figure 7:
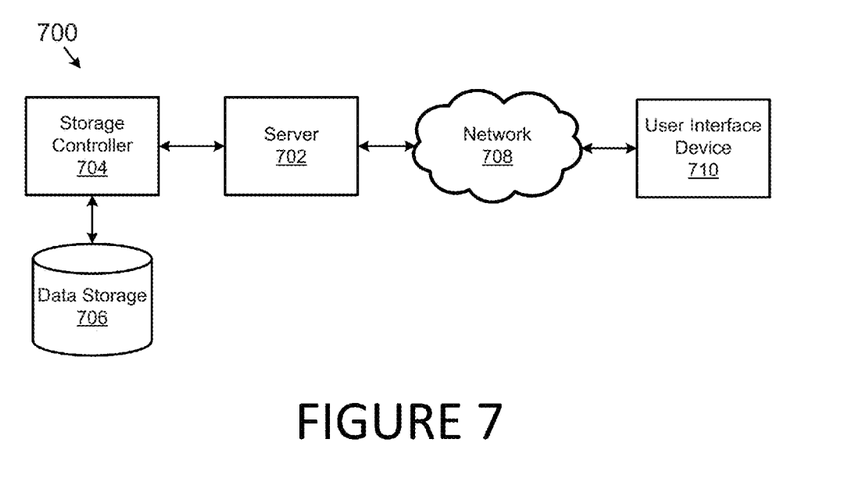
FIG. 7 illustrates one embodiment of a system for an information system, including a system for generating an application and invoking a method according to one embodiment.

FIG. 7 illustrates one embodiment of a system for an information system, including a system for generating an application and invoking a method according to one embodiment. The system 700 may include a server 702, a data storage device 706, a network 708, and a user interface device 710. In a further embodiment, the system 700 may include a storage controller 704, or storage server configured to manage data communications between the data storage device 706 and the server 702 or other components in communication with the network 708. In an alternative embodiment, the storage controller 704 may be coupled to the network 708. The system 700 may support code analysis by hosting databases 114, 116, and 118 of FIG. 1 on the cargo revenue accounting system 104.

In one embodiment, the user interface device 710 is referred to broadly and is intended to encompass a suitable processor-based device such as a desktop computer, a laptop computer, a personal digital assistant (PDA) or tablet computer, a smartphone, or other mobile communication device having access to the network 708. In a further embodiment, the user interface device 710 may access the Internet or other wide area or local area network to access a web application or web service hosted by the server 702 and may provide a user interface for communicating with the processing unit 108, pattern analyzer 110, rules generator 112, and/or any of the databases 114, 116, and 118 that may be controlled by separate processing units of FIG. 1.

The network 708 may facilitate communications of data between the server 702 and the user interface device 710. The network 708 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 8:
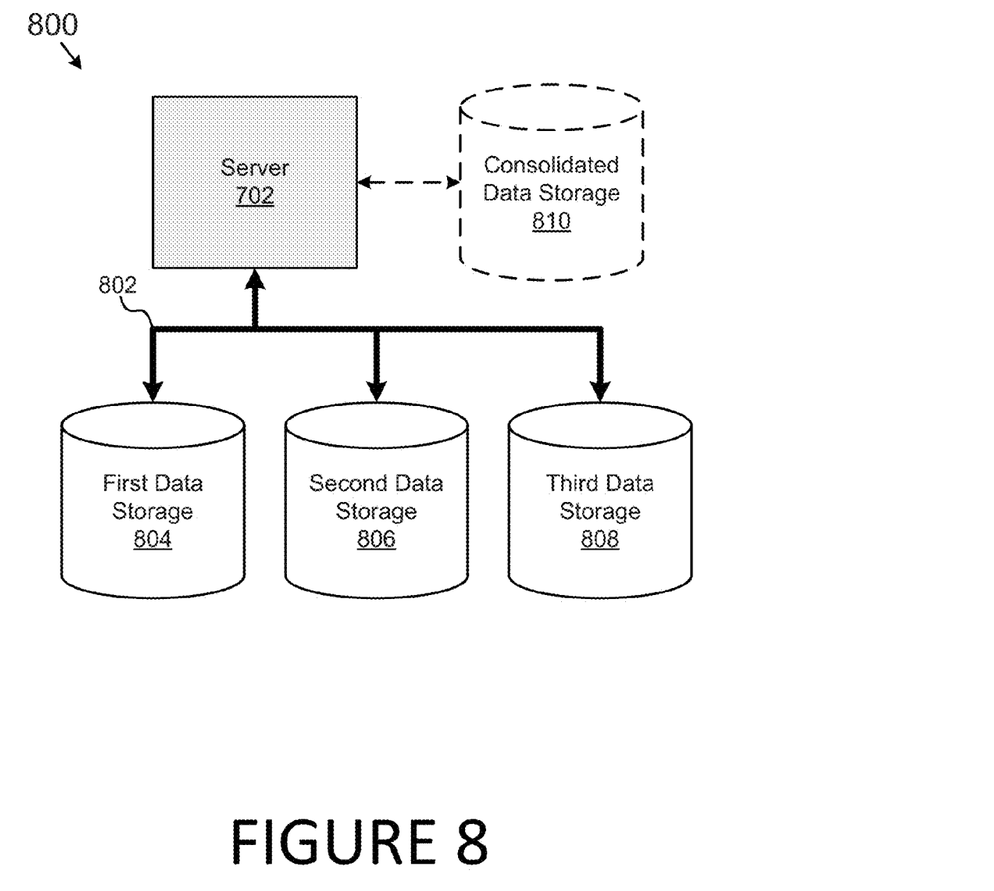
FIG. 8 illustrates one embodiment of a data management system configured to store and manage data related to audits of air waybills for a cargo revenue accounting system.

FIG. 8 illustrates one embodiment of a data management system 800 configured to store and manage data related to audits of air waybills for a cargo revenue accounting system 104. In one embodiment, the system 800 may include a server 702. The server 702 may be coupled to a data-bus 802. In one embodiment, the system 800 may also include a first data storage device 804, a second data storage device 806 and/or a third data storage device 808. In further embodiments, the system 800 may include additional data storage devices (not shown). In such an embodiment, each data storage device 804-808 may host a separate database of actions and rules that are either anomalies or rarely applied to air waybills, previously-defined additional data, or the like. The air waybill information in each database may be keyed to a common field or identifier, such as air waybill number, air waybill type, agent code, or the like. Alternatively, the storage devices 804-808 may be arranged in a RAID configuration for storing redundant copies of the database or databases through either synchronous or asynchronous redundancy updates.

In one embodiment, the server 702 may submit a query to selected data storage devices 804-808 to collect a consolidated set of data elements associated with previously audited air waybills. The server 702 may store the consolidated data set in a consolidated data storage device 810. In such an embodiment, the server 702 may refer back to the consolidated data storage device 810 to obtain a set of data elements associated with a specified air waybill attribute. Alternatively, the server 702 may query each of the data storage devices 804-808 independently or in a distributed query to obtain the set of data elements associated with actions, patterns, rules applied to air waybills. In another alternative embodiment, multiple databases may be stored on a single consolidated data storage device 810.

In various embodiments, the server 702 may communicate with the data storage devices 804-810 over the data-bus 802. The data-bus 802 may comprise a SAN, a LAN, or the like. The communication infrastructure may include Ethernet, Fibre-Channel Arbitrated. Loop (FC-AL), Small Computer System Interface (SCSI), and/or other similar data communication schemes associated with data storage and communication. For example, the server 702 may communicate indirectly with the data storage devices 804-810, the server first communicating with a storage server or storage controller 704.

In one example of the system 800, the first data storage device 804 may store data associated with rules that are defined by an auditor or a user of system 104. The auditor may create user-defined rules to apply to an air waybill based on a user's preference. In one embodiment, the second data storage device 806 may store a collection of actions taken by the user associated with previously audited air waybills. Any action may be taken on an air waybill, such as changing the total charge of a shipment to reflect a discount. The third data storage device 808 may store pattern-derived rules that may be invoked by the user of system 104 to apply to an air waybill. Pattern-derived audit rules may include rules based on an analyzed pattern as well as one or more user-defined audit rules. A fourth data storage device (not shown) may store statistical data associated with the accuracy and consistency of analyzed patterns and generated rules. For example, statistical data may include the number of times a particular rule is applied in comparison to another rule.

The server 702 may host a software application configured for auditing air waybills. The software application may further include modules or functions for interfacing with the data storage devices 804-810, interfacing with a network 708, interfacing with a user, and the like. In a further embodiment, the server 702 may host an engine, application plug-in, or application programming interface (API). In another embodiment, the server 702 may host a web service or web accessible software application.

Figure 9:
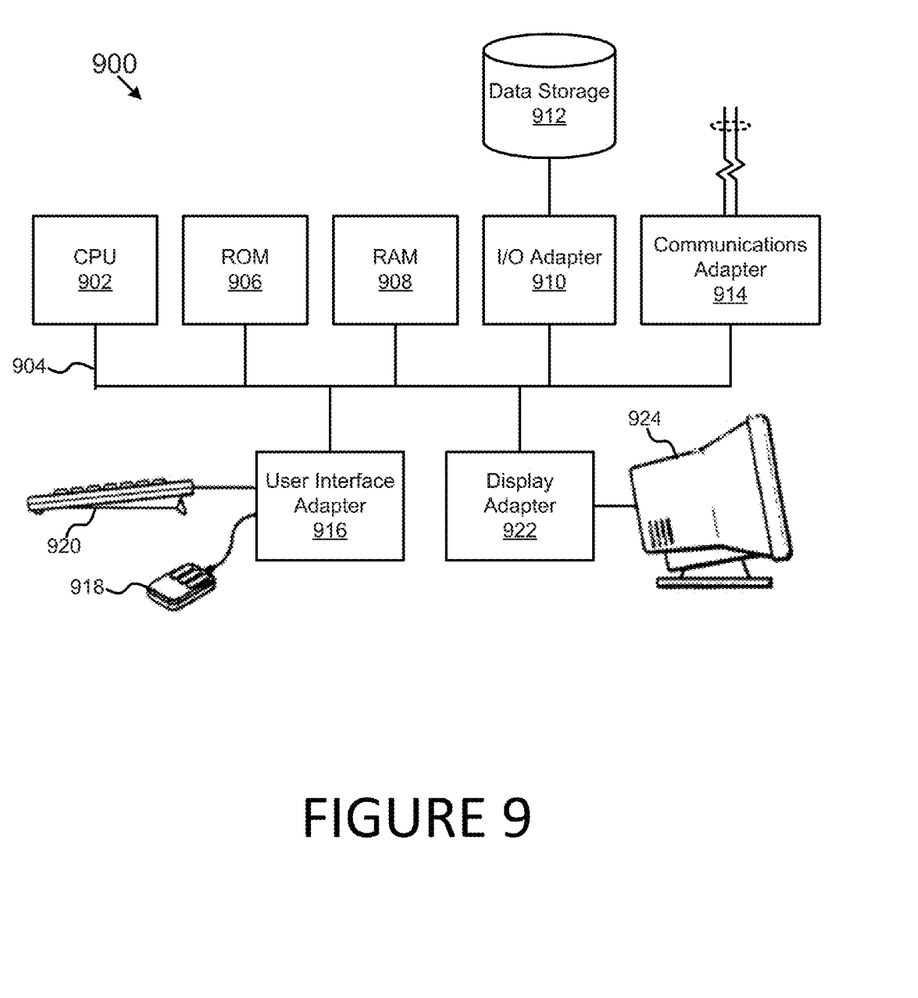
FIG. 9 illustrates a computer system adapted according to certain embodiments of the server and/or the user interface device.

FIG. 9 illustrates a computer system adapted according to certain embodiments of the server and/or the user interface device. The central processing unit ("CPU") 902 is coupled to the system bus 904. Although only a single CPU is shown, multiple CPUs may be present. The CPU 902 may be a general purpose CPU or microprocessor, graphics processing unit ("GPU"), and/or microcontroller. The present embodiments are not restricted by the architecture of the CPU 902 so long as the CPU 902, whether directly or indirectly, supports the operations as described herein. The CPU 902 may execute the various logical instructions according to the present embodiments.

The computer system 900 may also include random access memory (RAM) 908, which may be synchronous RAM (SRAM), dynamic RAM (DRAM), synchronous dynamic RAM (SDRAM), or the like. The computer system 900 may utilize RAM 908 to store the various data structures used by a software application. The computer system 900 may also include read only memory (ROM) 906 which may be PROM, EPROM, EEPROM, optical storage, or the like. The ROM may store configuration information for booting the computer system 900. The RAM 908 and the ROM 906 hold user and system data, and both the RAM 908 and the ROM 906 may be randomly accessed.

The computer system 900 may also include an input/output (I/O) adapter 910, a communications adapter 914, a user interface adapter 916, and a display adapter 922. The I/O adapter 910 and/or the user interface adapter 916 may, in certain embodiments, enable a user to interact with the computer system 900. In a further embodiment, the display adapter 922 may display a graphical user interface (GUI)

associated with a software or web-based application on a display device 924, such as a monitor or touch screen.

The I/O adapter 910 may couple one or more storage devices 912, such as one or more of a hard drive, a solid state storage device, a flash drive, a compact disc (CD) drive, a floppy disk drive, and a tape drive, to the computer system 900. According to one embodiment, the data storage 912 may be a separate server coupled to the computer system 900 through a network connection to the I/O adapter 910. The communications adapter 914 may be adapted to couple the computer system 900 to the network 908, which may be one or more of a LAN, WAN, and/or the Internet. The user interface adapter 916 couples user input devices, such as a keyboard 920, a pointing device 918, and/or a touch screen (not shown) to the computer system 900. The keyboard 920 may be an on-screen keyboard displayed on a touch panel. The display adapter 922 may be driven by the CPU 902 to control the display on the display device 924. Any of the devices 902-922 may be physical and/or logical.

The applications of the present disclosure are not limited to the architecture of computer system 900. Rather the computer system 900 is provided as an example of one type of computing device that may be adapted to perform the functions of the server 702 and/or the user interface device 710. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASICs), very large scale integrated (VLSI) circuits, or other circuitry. In fact, persons of ordinary skill in the art may utilize any number of suitable structures capable of executing logical operations according to the described embodiments. For example, the computer system may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. Additionally, the firmware and/or software may be executed by processors integrated with components described above.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A computer implemented method, comprising:
   receiving, by a cargo revenue accounting system, at least one audit transaction associated with a plurality of air waybills, wherein the cargo revenue accounting system includes a pattern analyzer and at least one database;
   determining, by the pattern analyzer, one or more patterns related to the at least one audit transaction and a plurality of previously-stored audit transactions associated with the plurality of air waybills;
   generating, by the pattern analyzer, one or more pattern-derived rules associated with the one or more patterns related to the at least one audit transaction and the plurality of previously stored audit transactions, wherein the pattern-derived rules comprise at least one of a generated rule and a corresponding action or transaction; and
   storing, by the cargo revenue accounting system, the one or more pattern-derived rules associated with the pattern in the database;
   wherein determining the pattern comprises:
   analyzing, by the pattern analyzer, the one or more patterns using an algorithm or an analytical tool; and
   applying, by the pattern analyzer, an anomaly detection scheme to the at least one audit transaction to filter out anomalies.

2. The computer implemented method of claim 1, further comprising receiving, by the computing system, at least one filtered audit transaction of a plurality of filtered audit transactions that is filtered by a user-defined attribute.

3. The computer implemented method of claim 1, wherein the one or more pattern-derived rules are also associated with one or more user-defined audit rules.

4. The computer implemented method of claim 1, wherein the one or more pattern-derived rules are active for a fixed amount of time.

5. The computer implemented method of claim 1, further comprising receiving, by the computing system, approval of the generated one or more pattern-derived rules.

6. The computer implemented method of claim 1, further comprising discarding, by the computing system, the generated one or more pattern-derived rules in response to the user disapproving the generated one or more pattern-derived rules.

7. A cargo revenue accounting apparatus, comprising:
   a pattern analyzer;
   at least one database;
   a processor; and a memory coupled to the processor, wherein the processor is configured to perform the steps of:

receiving, by cargo revenue accounting system, at least one audit transaction associated with a plurality of air waybills;

determining, by the pattern analyzer, one or more patterns related to the at least one audit transaction and a plurality of previously-stored audit transactions associated with the plurality of air waybills;

generating, by the pattern analyzer, one or more pattern-derived rules associated with the one or more patterns related to the at least one audit transaction and the plurality of previously stored audit transactions, wherein the pattern-derived rules comprise at feast one of a generated rule and a corresponding action or transaction; and storing, by the cargo revenue accounting system, the one or more pattern-derived rules associated with the pattern in the database; and analyzing, by the pattern analyzer, the one or more patterns using an algorithm or an analytical tool; and applying, by the pattern analyzer, an anomaly detection scheme to the at least one audit transaction to filter out anomalies.

8. The apparatus of claim 7, wherein the processor is further configured to perform the step of receiving, by the computing system, at least one filtered audit transaction of a plurality of filtered audit transactions that is filtered by a user-defined attribute.

9. The apparatus of claim 7, wherein the one or more pattern-derived rules are also associated with one or more user-defined audit rules.

10. The apparatus of claim 7, wherein the one or more pattern-derived rules are active for a fixed amount of time.

11. The apparatus of claim 7, wherein the processor is further configured to perform the step of receiving, by the computing system, approval of the generated one or more pattern-derived rules.

12. The apparatus of claim 7, wherein the processor is further configured to perform the step of discarding, by the computing system, the generated one or more pattern-derived rules in response to the user disapproving the generated one or more pattern-derived rules.

13. A computer program product, comprising:

a non-transitory computer readable medium comprising instructions which, when executed by a processor of a cargo revenue accounting system, cause the processor to:

receive, by a pattern analyzer within the cargo revenue accounting system, at least one audit transaction associated with a plurality of air waybills;

determine, by the pattern analyzer, one or more patterns related to the at least one audit transaction and a plurality of previously-stored audit transactions associated with the plurality of air waybills;

generate, by the pattern analyzer, one or more pattern-derived rules associated with the one or more patterns related to the at least one audit transaction and the plurality of previously stored audit transactions, wherein the pattern-derived rules comprise at least one of a generated rule and a corresponding action or transaction; and store, by the cargo revenue accounting system, the one or more pattern-derived rules associated with the pattern in a database within the cargo revenue accounting system; and analyzing, by the pattern analyzer, the one or more patterns using an algorithm or an analytical tool; and applying, by the pattern analyzer, an anomaly detection scheme to the at least one audit transaction to filter out anomalies.

14. The computer program product of claim 13, wherein the non-transitory computer readable medium further comprises instructions which, when executed by the processor of the computing system, cause the processor to receive, by the computing system, at least one filtered audit transaction of a plurality of filtered audit transactions that is filtered by a user-defined attribute.

15. The computer program product of claim 13, wherein the one or more pattern-derived rules are also associated with one or more user-defined audit rules.

16. The computer program product of claim 13, wherein the one or more pattern-derived rules are active for a fixed amount of time.

17. The computer program product of claim 13, wherein the non-transitory computer readable medium further comprises instructions which, when executed by the processor of the computing system, cause the processor to discard, by the computing system, the generated one or more pattern-derived rules in response to the user disapproving the generated one or more pattern-derived rules.

\* \* \* \* \*